(12) United States Patent
Clutterbuck

(10) Patent No.: US 6,270,218 B1
(45) Date of Patent: Aug. 7, 2001

(54) CONTACT LENSES WITH OFF-AXIS BEVEL

(75) Inventor: Timothy A. Clutterbuck, Jacksonville, FL (US)

(73) Assignee: Johnson & Johnson Vision Products, Inc., Jacksonville, FL (US)

( * ) Notice: Subject to any disclaimer, the term of this patent is extended or adjusted under 35 U.S.C. 154(b) by 0 days.

(21) Appl. No.: 09/178,731

(22) Filed: Oct. 26, 1998

(51) Int. Cl.[7] .................................................. G02C 7/04
(52) U.S. Cl. ...................................... 351/160 R; 351/174
(58) Field of Search ................................. 351/160 R, 161, 351/162, 160 H, 174, 177

(56) References Cited

U.S. PATENT DOCUMENTS

| 4,095,878 | 6/1978 | Fanti | 351/161 |
| 4,297,008 | 10/1981 | Woodford | 351/177 |
| 4,948,245 | * 8/1990 | Seger et al. | 351/160 H |
| 4,971,433 | * 11/1990 | Neefe | 351/162 |

FOREIGN PATENT DOCUMENTS

| 2192291 | * 1/1988 | (GB) | 351/161 |
| WO 86/02462 | * 4/1986 | (WO) | 351/161 |
| WO 90/09610 | * 8/1990 | (WO) | 351/160 R |

* cited by examiner

*Primary Examiner*—Huy Mai
(74) *Attorney, Agent, or Firm*—Lois Giannechi

(57) ABSTRACT

The invention provides contact lenses with off-axis bevels. The bevels aid in increasing stability of the lens on the eye and form a smooth junction with the lenticular zone of the lens.

22 Claims, 5 Drawing Sheets

CONTACT LENSES WITH OFF-AXIS BEVEL

FIELD OF THE INVENTION

The invention relates to contact lenses. In particular, the invention relates to contact lenses that have an off-axis bevel.

BACKGROUND OF THE INVENTION

The use of contact lenses for cosmetics and the correction of visual acuity is well known. Generally, contact lenses incorporate a convex surface bevel at the lens' periphery that acts to decrease the lens' edge thickness. Typically, these bevels are rotationally symmetric sections of a sphere. The center of curvature of which is located on the central axis of the lens.

These on-axis bevels form a junction with the non-optical lenticular zone of the lens. This junction is problematic in that it may act as a hinge point for the bevel allowing the bevel to turn in toward, or outwardly from, the wearer's eye. Further, the junction may be sufficiently sharp so as to make the lens uncomfortable to wear. Therefore, a need exists for a bevel that overcomes the disadvantages of the prior art bevel.

DETAILED DESCRIPTION OF THE INVENTION AND PREFERRED EMBODIMENTS

The invention provides an off-axis bevel for contact lenses, contact lenses incorporating the bevel, and methods for producing such bevels and contact lenses.

The bevels of the invention resist turning in toward and out from the wearer's eye and have greater strength to maintain their shape than do conventional bevels. Additionally, because the bevel forms a smooth junction with the lenticular area of the lens, the bevel is more comfortable to wear than conventionally beveled lenses. Finally, the bevel of the invention is advantageous because it has a greater bulk towards the lens' edge than does a conventional bevel to aid in maintaining the lens' shape and orientation.

In one embodiment, the invention provides a lens that comprises, consists essentially of, and consists of a concave and a convex surface, at least one of the surfaces comprising, consisting essentially of, and consisting of one or more off axis bevels. By "bevel" is meant an inclined area at the periphery of the lens. By "off-axise" is meant that the bevel is a rotationally symmetric section of a torus, the geometric center of the torus being located on the central axis of the lens. Preferably, the bevel is on the convex surface.

Contact lenses useful with the bevel of the invention may be either hard or soft lenses. Soft contact lenses, made of any material suitable for producing such lenses, preferably are used. The lenses of the invention may have any of a variety of corrective optical characteristics incorporated onto the surfaces. For example, the lens may have any one or more of spheric, aspheric, bifocal, multifocal, prismatic, or cylindric corrections These corrections may be on either or both the convex or concave surface. For example, the lens of the invention is a toric soft contact lens, meaning that the contact has a cylindrical optical surface, or power, to correct for the wearer's astigmatism.

Figure 1:
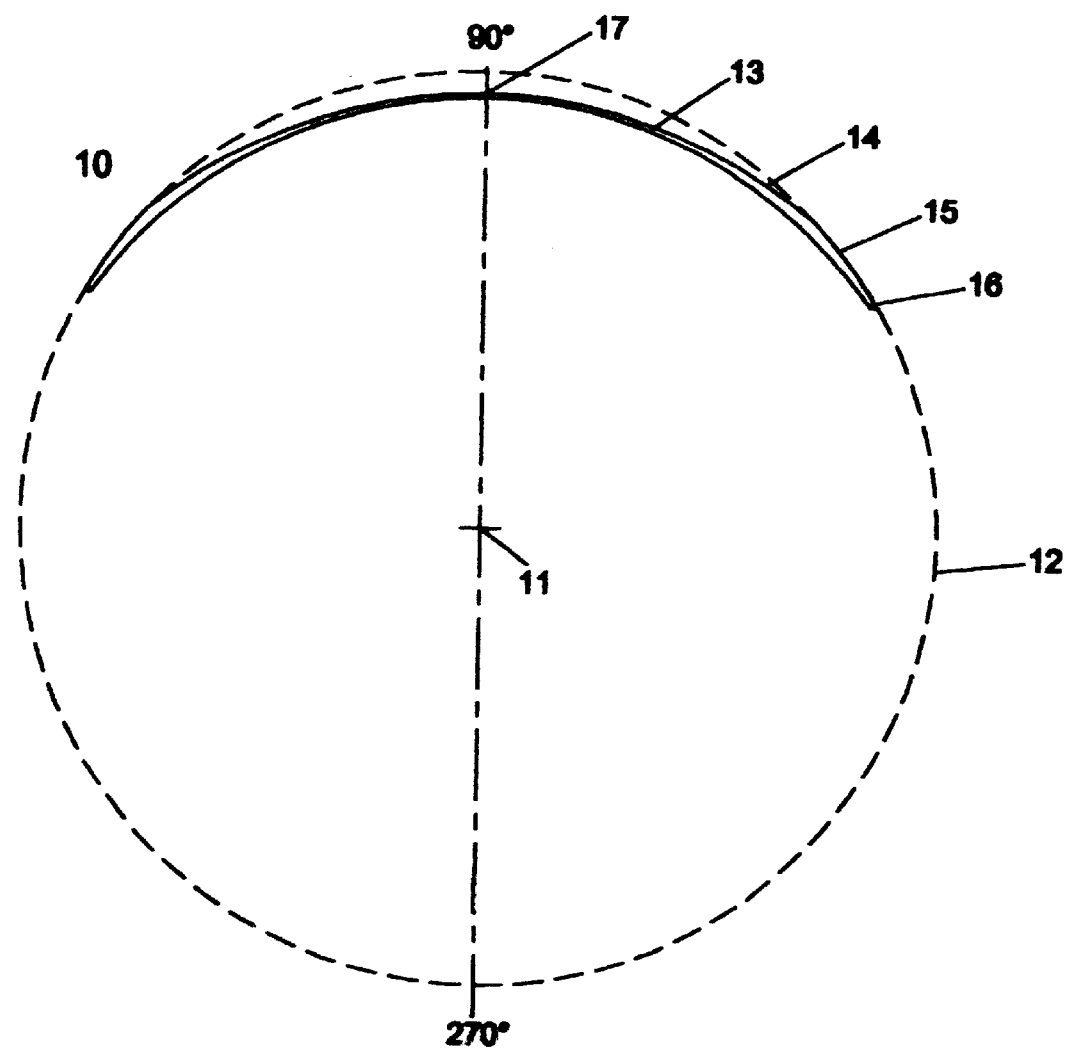
FIG. 1 is a cross-sectional view of a contact lens with a conventional, on-axis bevel.

Referring now to FIG. 1, contact lens 10 with prior art, on-axis bevel 15 is shown. The 90–270° axis of sphere 12, depicted by a dashed line and a portion of which is defined by bevel is, is centered at the geometric center 17 of lens 10. In addition to bevel 15, lens 10 has central optical zone 13 and nonoptical lenticular zone 14. The center of curvature of bevel 15 is coincident with the center of curvature 11 of sphere 12. The shape of the cross-section of the sphere, extending to its perimeter, is a circle.

Figure 2:
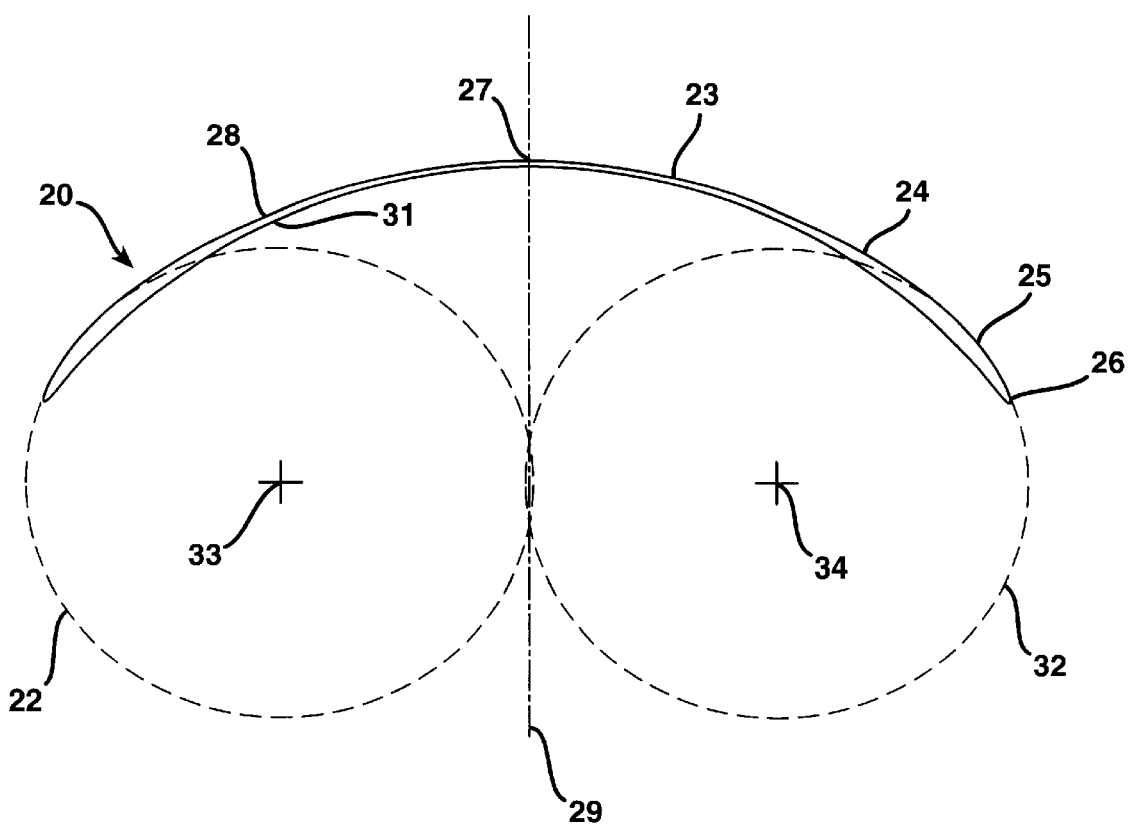
FIG. 2 is a cross-sectional view of a contact lens with an off-axis bevel of he invention.

In FIG. 2, contact lens 20 with off-axis bevel 25 is shown The convex, or outer, surface 28 of lens 20 has a central optical zone 23 the center of which is the geometric center 27 of lens 20. Central optical zone 23 may be of any desired geometry, such as spherical, spherical multifocal, toric, toric multifocal, aspherical, or the like. The precise geometry is selected to correspond to the lens' wearer's required prescriptive power. The optical zone of the concave, or inner, surface 31 of lens 20 may be of any desired geometry, such as a toric, or cylindrical, surface centered about a toric axis that corrects for the wearer's astigmatism.

Non-optical lenticular zone 24 surrounds central optical zone 23 and may be of any desired shape. Lenticular zone 24 is adjacent to, and forms a smooth junction with, bevel 25 which bevel is an off-axis bevel of the invention. The radius of bevel 25 is a part of a torus, the cross-section of which is depicted as circles 22 and 32. The centers of curvature 33 and 34 of circles 22 and 32, respectively, are located away from the central axis 29 of the lens.

The radius of curvature of each of the circles may be calculated using the diameters of the adjacent areas, such as lenticular zone 24 and lens edge 26. The surface normals of the torus and of the adjacent lenticular zone 24 at their junction are coincident. The result is that the surface slopes of the lenticular zone 24 and bevel 25 are identical and form a smooth junction.

Figure 3:
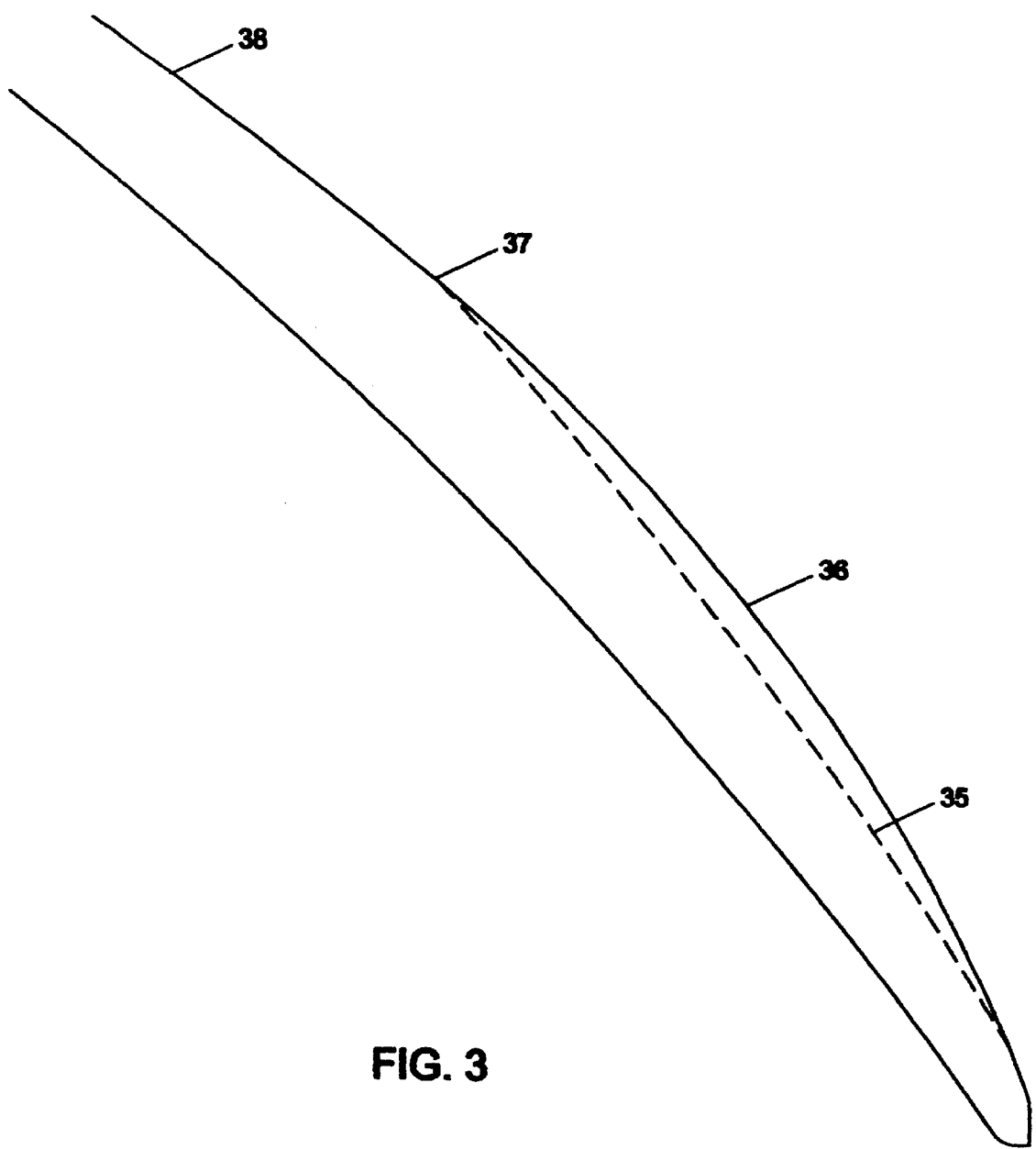
FIG. 3 is a magnified, cross-sectional view of on- and off-axis bevels.

FIG. 3 depicts a magnified, cross-sectional view of off-axis bevel 36. Dashed line 35 depicts the curvature of a conventional on-axis bevel. Bevel 36 smoothly connects with lenticular zone 38 at junction 37. As can be seen in FIG. 3, junction 37 would be a sharp junction if joined with the dashed line for the on-axis bevel.

Figure 4:
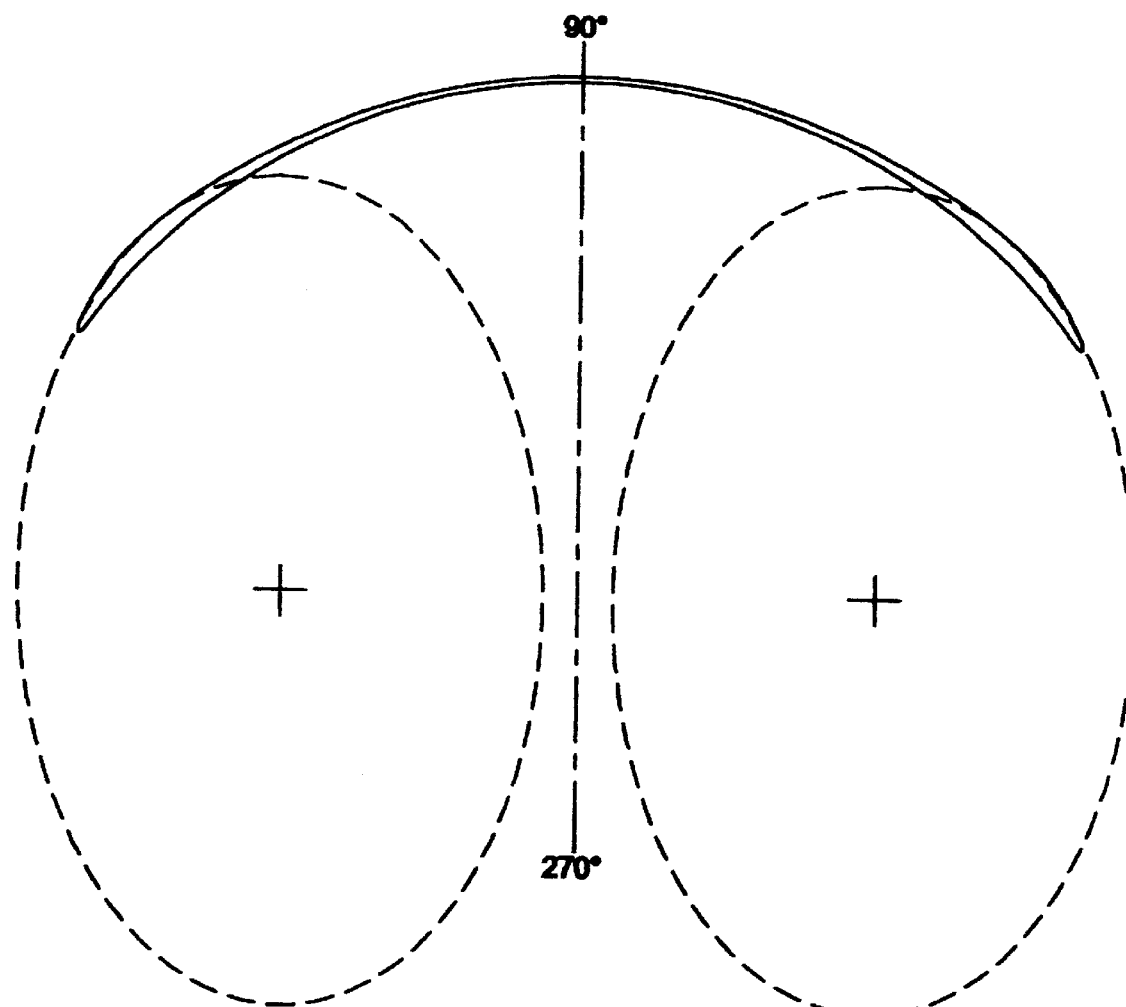
FIG. 4 is a cross-sectional depiction of a contact lens with an off-axis bevel of the invention.
Figure 5:
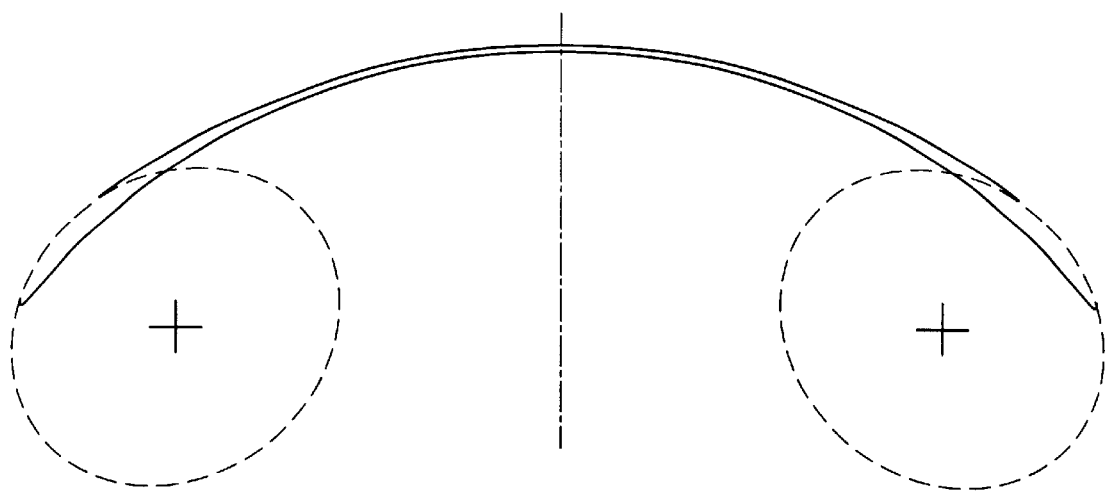
FIG. 5 is a cross-sectional view of a contact lens with an off-axis bevel of the invention.

Generally, the cross-section of a torus is of two circles. However, the torus may be such that a cross-section of the torus is of two ellipses, as shown in FIGS. 4. and 5. Alternatively, the torus may be variably-shaped, meaning that a cross-section, moving from one principal meridian to the other varies in size. The selection of which torus to use in forming the bevel of the invention will depend on the desired shape of the bevel. For example, use of a torus with a cross-section of two ellipses may be used to form a bevel with more mass at toward the edge of the lens. However, one ordinarily skilled in the art will recognize tat, from a design and manufacturing standpoint, a torus having a cross-section of two circles is easily calculated and programmable and, thus, may be preferred.

The bevels of the invention may be formed by any convenient means. For example, an optical cutting tool with a numerically controlled lathe may be used to form a metallic optical tool incorporating the off-axis bevel of the invention. The tool is then used to make convex surface molds that are then used, in conjunction with concave surface molds, to form the lens of the invention using a suitable liquid resin placed between the molds followed by compression and curing of the resin.

It will be understood by those of ordinary skill in the art that various other changes of the details of the invention described may be made. Such changes are intended to be included within the scope of the invention claimed.

What is claimed is:

1. A contact lens comprising a concave and a convex surface, at least one of the surfaces comprising one or more off-axis bevels and a lenticular zone adjacent to the off-axis bevel, wherein the junction between the lenticular zone and the bevel is a smooth junction.

2. The lens of claim 1 wherein the at least one surface is the convex surface of the lens.

3. The lens of claim 1 wherein the lens is a soft contact lens.

4. The lens of claim 1 wherein the concave surface of the lens comprises an optical zone that is toric.

5. A soft contact lens comprising a concave and a convex surface, the convex surface comprising a central optical zone, one or more off-axis bevels, and a lenticular zone adjacent to the off-axis bevel wherein the lenticular zone forms a smooth junction with the bevel.

6. The contact lens of claim 5, wherein the concave surface has an optical zone that is toric.

7. A method for producing a contact lens comprising the step of providing a contact lens with a convex and a concave surface, one or more off-axis bevels on at least one of the surfaces and a lenticular zone adjacent to the off-axis bevel, wherein the junction between the lenticular zone and the bevel is a smooth junction.

8. A contact lens comprising a concave surface, a convex surface, a central axis, and a lenticular zone, at least one of the surfaces comprising one or more bevels that are rotationally symmetric sections of a torus and wherein the geometric center of the torus is located on the central axis of the lens and wherein the lenticular zone is adjacent to the off-axis bevel and the junction between the lenticular zone and the bevel is a smooth junction.

9. The lens of claim 8, wherein the torus has a cross-section that comprises two circles.

10. The lens of claim 9, wherein the concave surface of the lens comprises an optical zone that is toric.

11. The lens of claim 10, wherein the lens is a soft contact lens.

12. The lens of claim 8, wherein the torus has a cross-section that comprises two ellipses.

13. The lens of claim 8, wherein the at least one surface is the convex surface of the lens.

14. The lens of claim 8, wherein the lens is a soft contact lens.

15. The lens of claim 8, wherein the concave surface of the lens comprises an optical zone that is toric.

16. A method for producing a contact lens comprising the step of providing a lens with a concave surface, a convex surface, and a central axis, at least one of the surfaces comprising one or more bevels that are rotationally symmetric sections of a torus and wherein the geometric center of the torus is located on the central axis of the lens.

17. The method of claim 16, wherein the torus has a cross-section that comprises two circles.

18. The method of claim 17, wherein the concave surface of the lens comprises an optical zone that is toric.

19. The method of claim 18, wherein the lens is a soft contact lens.

20. The method of claim 16, wherein the torus has a cross-section that comprises two ellipses.

21. The method of claim 16, wherein the lens is a soft contact lens.

22. The method of claim 16, wherein the concave surface of the lens comprises an optical zone that is toric.

* * * * *